United States Patent
Dundar et al.

(10) Patent No.: US 7,379,829 B2
(45) Date of Patent: May 27, 2008

(54) METHOD AND APPARATUS FOR AUTOMATED CHARACTERIZATION OF OBJECTS WITH UNKNOWN RF CHARACTERISTICS

(75) Inventors: Baris Dundar, San Pablo, CA (US); Raymond Rui-Feng Liao, Pleasanton, CA (US); Wei Yu, Albany, CA (US); Jaimyoung Kwon, Alameda, CA (US)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/361,911

(22) Filed: Feb. 23, 2006

(65) Prior Publication Data

US 2007/0198227 A1    Aug. 23, 2007

(51) Int. Cl.
*G06F 19/00* (2006.01)

(52) U.S. Cl. ............... 702/57; 702/189; 455/446; 455/422.1; 235/462.46

(58) Field of Classification Search ............ 702/57; 455/446, 422.1; 235/462.46, 383, 492–493
See application file for complete search history.

(56) References Cited

U.S. PATENT DOCUMENTS

| | | | |
|---|---|---|---|
| 5,394,522 A | | 2/1995 | Sanchez-Frank et al. |
| 5,450,615 A | | 9/1995 | Fortune et al. |
| 5,640,002 A | * | 6/1997 | Ruppert et al. ........ 235/462.46 |
| 5,686,705 A | * | 11/1997 | Conroy et al. ........... 178/18.05 |
| 5,732,077 A | | 3/1998 | Whitehead |
| 5,949,988 A | | 9/1999 | Feisullin et al. |
| 6,059,842 A | | 5/2000 | Dumarot et al. |
| 6,119,009 A | * | 9/2000 | Baranger et al. ........... 455/446 |
| 6,317,599 B1 | | 11/2001 | Rappaport et al. |
| 6,330,429 B1 | | 12/2001 | He |
| 6,336,035 B1 | | 1/2002 | Somoza et al. |
| 6,337,688 B1 | | 1/2002 | Berstis |
| 6,360,107 B1 | | 3/2002 | Lin et al. |
| 6,393,290 B1 | | 5/2002 | Ufongene |
| 6,522,888 B1 | | 2/2003 | Garceran et al. |
| 6,654,612 B1 | | 11/2003 | Avidor et al. |

(Continued)

FOREIGN PATENT DOCUMENTS

EP    1175115 A2    1/2002

(Continued)

OTHER PUBLICATIONS

Iwama T, et al.: "Investigation of Propagation Characteristics above 1 GHz for Microcellular Land Mobile Radio"; May 6, 1990; pp. 396-400.

(Continued)

*Primary Examiner*—John E Barlow, Jr.
*Assistant Examiner*—Hien Vo (57) ABSTRACT

A method for generating radio frequency (RF) planning modeling data for an object. The method includes placing an RF signal source near the object and sequentially positioning a receiver at a plurality of locations around the object. At each of the locations, an indication is provided to the receiver that it is at a measurement location, and the receiver is allowed to detect a level of the RF signal produced by the RF signal source at the measurement location. In another aspect, an opening in an object is modeled as a virtual object that overlaps with the object and has a "negative attenuation" characteristic to cancel out the "positive attenuation" characteristic of the object.

20 Claims, 9 Drawing Sheets

U.S. PATENT DOCUMENTS

| | | |
|---|---|---|
| 6,885,191 B1 | 4/2005 | Gleman |
| 2004/0181374 A1 | 9/2004 | Rappaport et al. |
| 2007/0106717 A1 | 5/2007 | Dundar et al. |
| 2007/0197225 A1 | 8/2007 | Dundar et al. |

FOREIGN PATENT DOCUMENTS

| | | |
|---|---|---|
| WO | WO 98/03025 A1 | 1/1998 |
| WO | WO 99/30448 A1 | 6/1999 |
| WO | WO 02/10942 A1 | 2/2002 |

OTHER PUBLICATIONS

Search Report for PCT/US2006/044433, dated Mar. 29, 2007.

H. He J. McDowell & M. Conroy; "asc coordinate transformation the pixlib library, II" Astronomical Data Analysis Software Systems VII, APS Conference Series; vol. 145, 1998; pp. 1-4.

U.S. Appl. No. 11/624,167, Dundar et al.

Florence Sagnard, "The Matlab Graphical Interface ECAMO", Internet Publication, (online) Jul. 5, 2002, Retrieved from the internet: http://www.univ-mlv.fr/crmo/interfaces/ECAMO/fiche_ecamo_0801.pdf.

William C. Y. Lee: "Wireless and Cellular Communication (part)" Book, Oct. 22, 2005, pp. 396-402.

K. E. Oliver: "Introduction to Automatic Design of Wireless Networks"; ACM Crossroads 11.4: Mobile and Wirelss Networking, (online) Jun. 2005, Retrieved from the internet: http://www.acm.org/crossroads/xrds11-4/automaticdesign.html>.

G. Bianchi, "Performance Analysis of the IEEE 802.11 Distributed Coordination Function". IEEE Journal of Selected Areas in Communication, 18(3), Mar. 2003, pp. 535-547.

A. Veres, et al., "Supporting Service Differentiation in Wireless Frame Networks Using Distributed Control", IEEE Journal of Selected Areas in Communication, 19(10), Oct. 2001, pp. 2081-2093.

Steven J. Fortune, et al., "Wise Design of Indoor and Outdoor Wireless Systems: Practical Computation and Optimization", IEEE Computational Science & Engineering, Spring 1995 Lucent Bell Labs., pp. 58-68.

* cited by examiner

METHOD AND APPARATUS FOR AUTOMATED CHARACTERIZATION OF OBJECTS WITH UNKNOWN RF CHARACTERISTICS

BACKGROUND

Radio frequency (RF) planning is frequently a part of plans to deploy a large-scale wireless local area network (LAN). The purpose of RF planning is to ensure an adequate quality of RF signal coverage across the area in which the wireless LAN is to be deployed. Data to be considered for RF planning includes signal-to-noise ratio (SNR) and signal-to-noise-plus-interference ratio (SINR).

Conventional RF planning efforts generate data that indicates the locations of building features, relevant objects, and planned and/or existing sources of RF signals within a building. However, it is difficult to model the RF characteristics of some objects, such as large machine tools for use on factory floors. It is also difficult to model, for RF planning purposes, objects that have openings in them, such as floors interrupted by an atrium.

SUMMARY

The present invention generally relates to planning of wireless communication networks. In particular, apparatus and methods are presented for generating RF planning modeling data for an object.

According to some embodiments, a method, an apparatus and an article of manufacture that includes a computer usable medium containing computer readable program code are provided. The method steps and/or the steps performed by the apparatus and/or the steps called for by the computer readable program code include placing an RF signal source in proximity to an object, and sequentially positioning a receiver at a plurality of locations around the object. Further, at each of the locations, an indication is provided to the receiver that the receiver is at the location in question, and the receiver is allowed to detect a level of the RF signal produced by the RF source.

The number of locations may be 5, 10 or more. The receiver may include a touch screen. The indication may be provided to the receiver by touching the touch screen with a stylus at a point on the map displayed by the touch screen. The point touched with the stylus may correspond to the location in question.

Moreover, at each location, the detected level of the RF signal may be recorded in response to the touching of the touch screen. The recorded detected levels of the RF signal may be analyzed to determine at least one attenuation parameter characteristic for the object. The analysis may include applying a line-fitting technique to data derived from the recorded detected levels of the RF signal.

In other aspects, the receiver may be sequentially positioned around more than one object and the analysis may include analyzing the recorded levels of the RF signal to determine at least one respective attenuation parameter characteristic for each of the objects.

With respect to at least one location at which the receiver is positioned, at least two of the objects may obstruct the line of sight between the RF source and the location in question.

The map displayed by the touch screen may include an indication of the location of the RF signal source and an indication of the location of the object.

As used herein and in the appended claims, "in proximity to an object" means within 20 yards of the object.

In another aspect, the method steps may include inputting, to a computer, source data representative of RF sources in a proposed wireless data network; inputting, to the computer, first object data representative of objects located in the environment of the proposed wireless data network; inputting, to the computer, second object data representative of openings in the objects located in the environment of the proposed wireless data network; and using the source data, the first object data and the second object data to calculate, by use of the computer, estimated signal levels to be provided at points in space by the proposed wireless data network.

In some embodiments, the first object data represents each of the objects located in the environment of the proposed wireless data network in terms of location, physical extent and an attenuation characteristic having a first sense, and the second object data represents each of the openings as a virtual object in terms of location, physical extent and an attenuation characteristic that is equal in magnitude and opposite in sense to the attenuation characteristic of the respective object in which the opening in question is formed.

It will be understood that the "sense" of a non-zero number is the characteristic of the number which indicates whether the number is greater than zero or less than zero. Thus, a negative number has a sense that is opposite to the sense of a positive number, and a positive number has a sense that is opposite to the sense of a negative number.

The objects located in the environment of the proposed wireless data network may include one or more of walls and floors.

In still another aspect, a measurement device includes a housing, a processor mounted inside the housing, a display mounted on the housing and controlled by the processor; and a signal level device that is in communication with the processor. The signal level device is for measuring the level of a received RF signal. The memory stores program instructions to control the processor to:

receive a first indication, which is indicative of a current location of an RF signal source;

receive a second indication, which is indicative of a current location of an object;

receive a third indication, which is indicative of the current location of the measurement device;

receive a fourth indication, which indicates that the measurement device is currently at a measurement location; and respond to the fourth indication by recording, in association with data that indicates the measurement location, the current level of the RF signal measured by the signal level device.

In some embodiments, the second indication may be received before the first indication, or the first indication may be received before the second indication.

The display may include a touch screen, and the processor may be operative to simultaneously receive the third and fourth indications by detecting a single stylus touch on the touch screen. The touch screen may include (display) a map that shows a representation of the current location of the object and a representation of the current location of the RF signal source. The single stylus touch may be at a point on the map that corresponds to the current location of the measurement device.

In other embodiments, the measurement device may include a Global Positioning System (GPS) unit in the housing, and the processor may receive the third indication from the GPS unit.

The measurement device may have a form factor that is substantially equal to the form factor of a notebook computer or of a personal digital assistant (PDA).

Further aspects of the instant system will be more readily appreciated upon review of the detailed description of the preferred embodiments included below when taken in conjunction with the accompanying drawings.

DETAILED DESCRIPTION OF SPECIFIC EMBODIMENTS

According to some embodiments, RF modeling is performed with respect to an object by temporarily placing an access point or other RF source near the object, and then using a portable receiver to measure the level of RF signal at various locations around the object. A convenient, touchscreen-based user interface may be provided on the receiver to trigger measurement readings. The RF characteristics of the object are estimated by analyzing the signal levels detected at the locations around the object.

In other aspects, object modeling for RF planning purposes includes modeling of openings in objects as "virtual objects" that have a negative attenuation characteristic to offset the attenuation that would occur if the openings were not present in the objects. As a result, the inputting of object data for RF planning purposes can be simplified and/or made more accurate.

Figure 1:
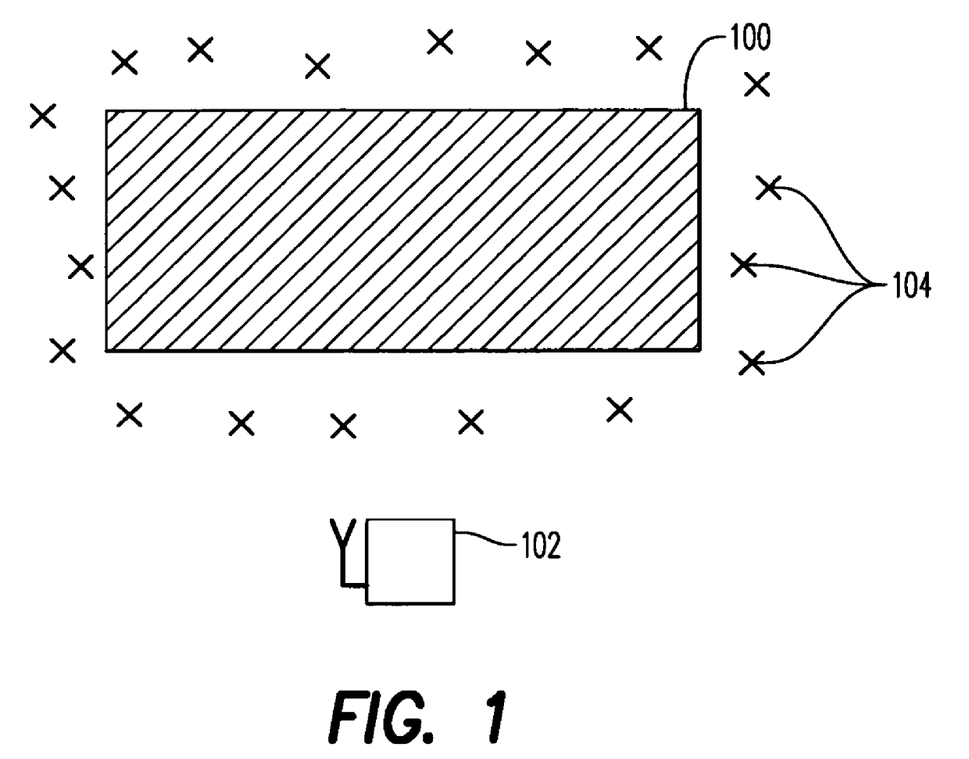
FIG. 1 schematically illustrates a process for RF-modeling an object.

FIG. 1 schematically illustrates a process for RF-modeling an object, such as a large machine tool for use on a factory floor. In FIG. 1, shaded rectangle 100 represents the object to be modeled. Reference numeral 102 indicates an access point or other source of RF signals that is temporarily placed in proximity to the object 100 as part of the modeling process. (The RF signal source may be a commercially available access point or base station.) Cross marks (of which some are indicated by reference numeral 104) represent locations around the object 100 at which signal level measurements are to be made as part of the modeling process. As will be seen, the measured signal levels may be analyzed to produce a model of the RF attenuation characteristics of the object 100.

Figure 2:
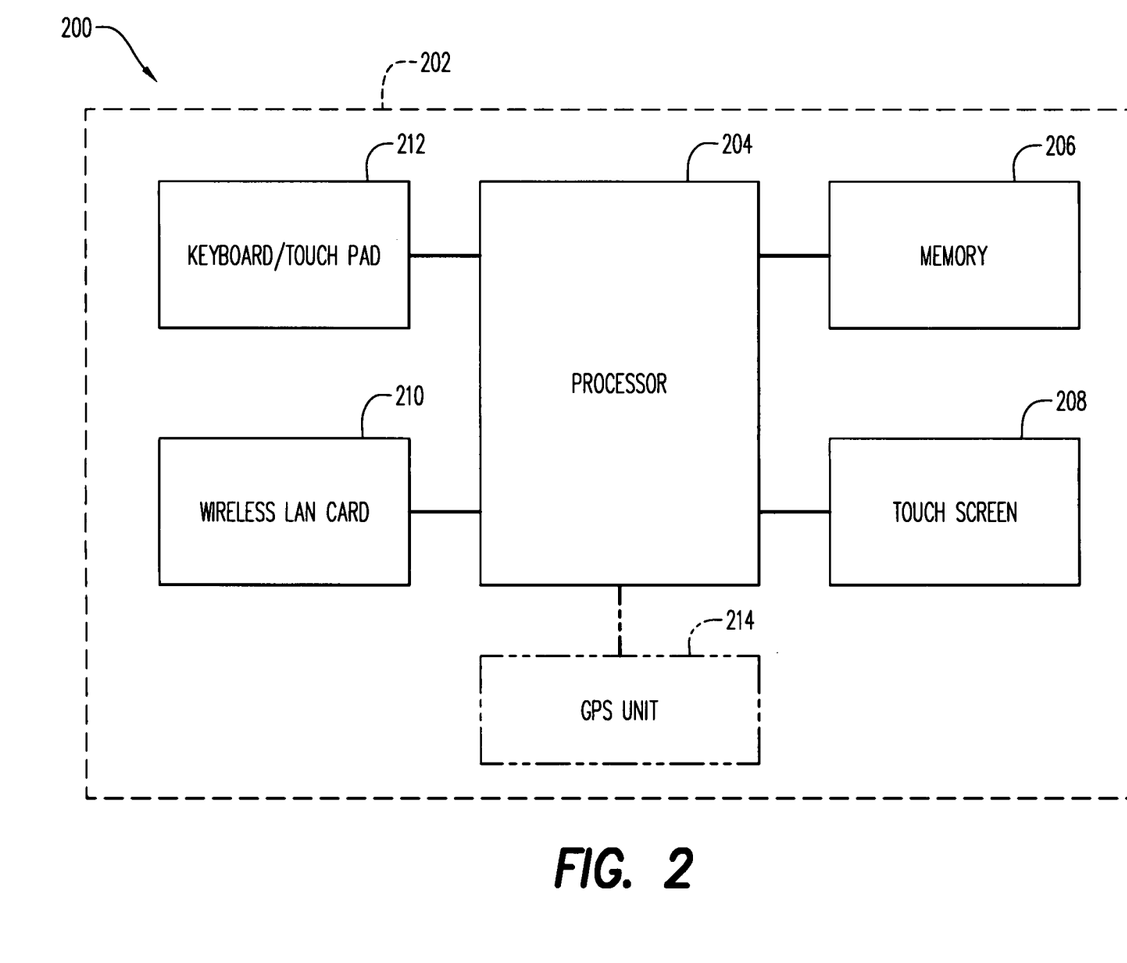
FIG. 2 is a simplified block diagram of a receiver used in the RF-modeling process of FIG. 1.

FIG. 2 is a simplified block diagram of a receiver or measurement device 200 that may be utilized in some embodiments to take the signal level measurements at the locations 104. For the most part, in its hardware aspects, the measurement device 200 may be constituted by conventional hardware for a notebook computer or a PDA. In other words, the measurement device 200 may be a handheld, portable computing device.

The measurement device 200 may include a housing 202, indicated in phantom. The housing 202 may be the same as, or similar to, the types of housing employed for a notebook computer or a PDA. The measurement device 200 may further include a processor 204 mounted inside the housing 202. The processor 204 may serve as the central processing unit (CPU) for the measurement device 200 and may be, for example, a conventional microprocessor.

The measurement device 200 may also include one or more memory devices, indicated at 206. The memory device(s) 206 may be constituted by one or more of RAM (random access memory), ROM (read only memory) and flash memory, and may also be considered to include one or more mass storage devices, such as a hard disk and/or a floppy disk drive. The memory device(s) 206 is in communication with the processor 204. The memory device(s) 206 may permanently or temporarily store software that includes program instructions to control operation of the processor 204 and hence control operation of the measurement device 200. The program instructions may cause the processor 204 to operate to provide the functionality described herein.

In addition, the measurement device 200 may include a touch screen 208 or another type of display device, such as a conventional display device included in notebook computers. The touch screen 208 may be in communication with the processor 204 and may be controlled by the processor 204 in terms of the information displayed by the touch screen 208. Moreover, input indications provided by touching the touch screen 208 may be provided as input to the processor 204. In some embodiments, the touch screen may be particularly suitable for receiving input by being touched with a stylus (not shown).

Still further, the measurement device 200 may include a wireless LAN (local area network) card 210, which may be in communication with the processor 204. For example, the wireless LAN card 210 may be constituted by the model CP7515 wireless LAN card available from Siemens Corporation, the assignee hereof. In addition to handling data communications from/to the measurement device 200 via a wireless LAN which is not shown, the LAN card 210 is also operable to measure in real time the level of an RF signal received at the measurement device 200, and to provide input to the processor 204 indicative of the measured signal level.

Also, the measurement device 200 may include conventional input devices (indicated at 212) such as a keyboard and a touch pad or similar device for controlling a cursor and clicking to provide input to the processor 204.

In some embodiments, the measurement device 200 may also include a conventional GPS unit 214 in communication with the processor 204. As is familiar to those who are skilled in the art, the GPS unit 214 may operate to receive signals from earth satellites that are part of the well-known GPS system. The GPS unit 214 may analyze the satellite signals to determine the current location of the measurement device 200. The GPS unit 214, if present, may provide signals to the processor 204 to indicate to the processor 204 the current position of the measurement device 200.

In outward appearance and in form factor and in the shape and size of the housing 202, the measurement device 200 may resemble a conventional notebook computer or PDA.

Thus, if the measurement device 200 resembles a notebook computer, the housing 202 may be foldable, such that the display device 208 and the keyboard/touch pad 212 are hidden from view when the housing is in its folded configuration. However, in other embodiments, to optimize convenience of operation of the measurement device for measurement operations described herein, the housing may be of the same general size as a folded notebook computer, but may be of a fixed configuration, rather than foldable, and with the touch screen 208 on an outer surface of the housing 202. Moreover, the touch screen may be operable by a stylus to facilitate triggering of RF signal level measurements.

Figure 3:
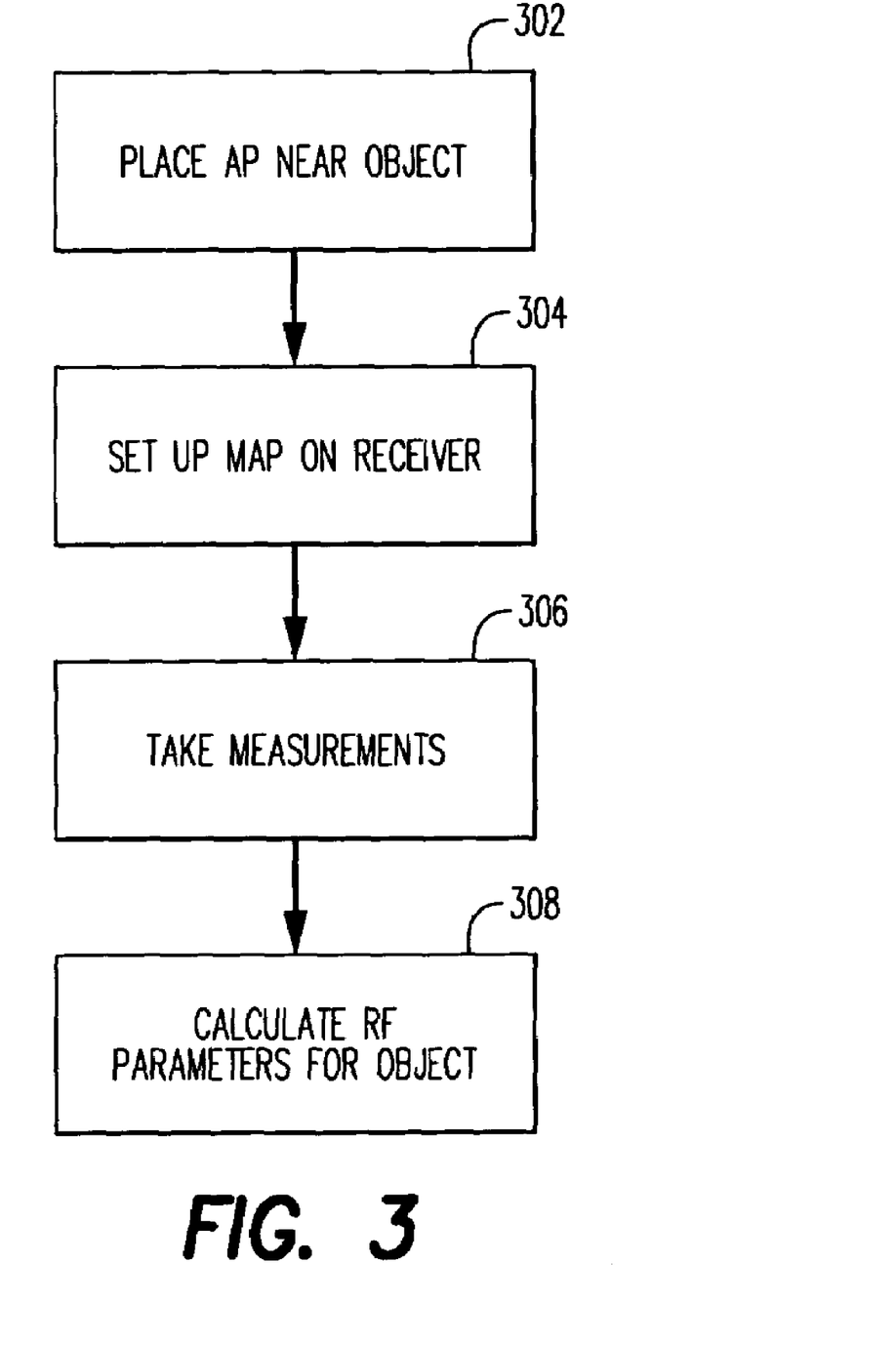
FIG. 3 is a high-level flow chart that illustrates the process of FIG. 1.

FIG. 3 is a high-level flow chart that illustrates the process of FIG. 1.

At 302 in FIG. 3, an access point or other source of an RF signal is placed near the object to be modeled for RF planning purposes. Typically the access point may be placed within 5 to 10 feet from the object but the distance between the access point and the object may be greater or smaller than as just stated.

At 304, the user who is conducting the modeling operation interacts with the receiver 200 to cause the receiver 200 to display on its display device a map that represents the location of the object and of the access point. For example, against a background with a coordinate system or the like, the user may operate a computer drawing tool to create a rectangle that represents the object to be modeled. (If the "footprint" of the object to be modeled is not rectangular, the user may use a computer line drawing tool to create a drawing figure that reflects the geometry of the footprint of the object.) The user may also "drag and drop" an icon that represents the access point so that the icon is placed on the display in a manner to accurately show the location of the access point relative to the object (represented on the display by a rectangle or other drawing figure, as noted above). As a result, the map displayed on the display device may include, in addition to the above-mentioned coordinate system, drawing elements like items 100 and 102 shown in FIG. 1. It may be desirable that the size of the rectangle or drawing figure shown on the map be an accurate reflection, in terms of the map's coordinate system, of the actual size of the object to be modeled.

Figure 4:
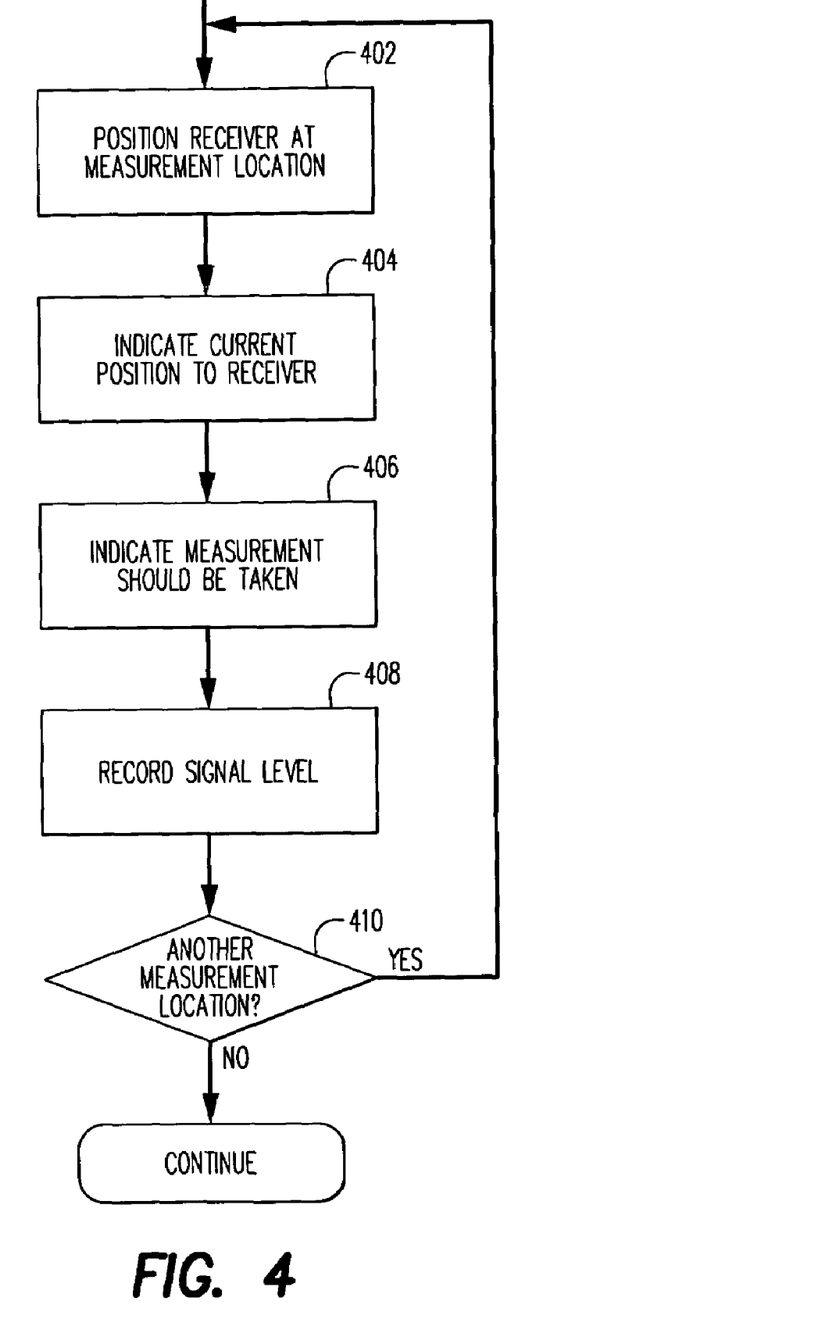
FIG. 4 is a flow chart that shows some details of the process of FIGS. 1 and 3.

At 306 in FIG. 3, the user may operate the receiver to take RF signal level measurements at various locations around the object to be modeled. FIG. 4 is a flow chart that illustrates some details of step 306.

At 402 in FIG. 4, the user positions the receiver 200 at a location near the object at which a signal level measurement is to be obtained. At 404, the user interacts with the receiver 200 to indicate to the receiver 200 the current location at which the receiver 200 is located. For example, if the receiver 200 includes a touch screen, the user may touch the touch screen with a stylus at a point on the map displayed by the touch screen that corresponds to the current location at which the receiver is positioned, thereby indicating to the receiver that it is located at the location that corresponds to the point on the map that is touched by the stylus. The same touch of the stylus on the touch screen may also indicate to the receiver (step 406) that the receiver should now take a measurement of the level of the RF signal that is being received by the receiver from the access point. Thus, in response to receiving the indication at 406, the processor 204 of the receiver 200 may receive from the wireless LAN card 210 data which indicates the level of the RF signal received by the wireless LAN card 210, and the processor may record (step 408) the signal level data in the memory device 206 in association with data that indicates the location at which the receiver 200 is currently positioned.

With step 408 having been accomplished, the taking of one signal level measurement is complete, and the user then determines (step 410) whether a further signal level measurement needs to be taken. If so, steps 402-408 are repeated with the receiver positioned at another location near the object to be modeled. Typically, the user may walk around the object and may stop every 5 feet or so, and at each stop may trigger the receiver to take a signal level measurement. For example, to model an object that is about 10 feet by 10 feet in horizontal extent, the user may take about 10 measurements at various locations around the object.

It should be understood that the indications provided in steps 404 and 406 may be accomplished in another manner than the above-described single stylus touch. For example, the receiver need not include a touch screen and/or the user may indicate the current location of the receiver by moving a cursor on the map to the point on the map which corresponds to the current location of the receiver and then clicking a button on a touch pad arrangement. The user may then use the cursor and touch pad to click a virtual button on the display to indicate that a signal level measurement should now be taken. Alternatively, the touch pad button click which indicates to the receiver the location at which the receiver is currently positioned may also indicate to the receiver that a signal level measurement should now be taken.

Referring again to FIG. 3, after all the required signal level measurements have been taken at locations around the object to be modeled, at 308 the receiver may use the resulting data to calculate at least one RF attenuation parameter for the object.

The present invention proposes an alternative to the conventional log distance formula used to calculate the received signal strength indicator (RSSI):

$$\text{RSSI} = \alpha + \beta \cdot \log_{10}(\text{Dist}) + \Sigma_i \xi_i \quad \text{(Eq. 1)}$$

In this conventional formula, Dist is the distance between the signal source and the receiver; $\alpha$ and $\beta$ are free-space line-of-sight attenuation parameters; and $\xi_i$ is the parameter which models the attenuation effect of an object between the signal source and the receiver. The value of $\xi_i$ is measured as the difference in RSSI which results from adding and then removing the object into and from the signal path. This conventional technique omits consideration of the geometry of the objects and instead loosely categorizes an object as "thin" or "thick". This approach may not be suitable for some objects, including for example large machine tools used on a factory floor.

The present invention proposes to model certain objects as RF-attenuation regions. With this model, the log distance formula is extended as follows:

$$\text{RSSI} = \alpha + \beta \cdot \log_{10}(\text{Dist}) + \Sigma_i \gamma_i \cdot \log_{10}(1 + \text{length}_i) \quad \text{(Eq. 2)}$$

In essence, in this formula, the attenuation value $\xi_i$ is expanded into $\gamma_i \cdot \log_{10}(1+\text{length}_i)$, where $\text{length}_i$ is the distance the signal traverses in passing through the i'th RF-attenuation region; and $\gamma_i$ is the attenuation parameter for the object represented by the i'th RF-attenuation region.

Figure 8:
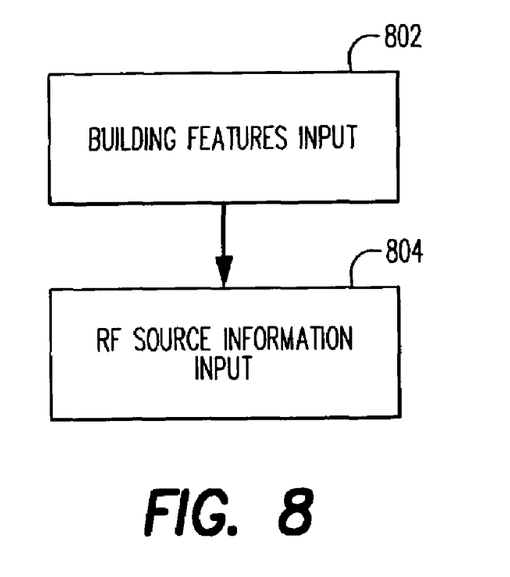
FIG. 8 is a flow chart that illustrates some details of the process of FIG. 7.

In analyzing the stored signal level data obtained at step 306 in FIG. 8, a conventional ray-plane intersection algorithm is used to calculate $\text{length}_i$. The data is then classified as line of sight or non-line of sight based on whether or not the value of $\text{length}_i$ is zero.

Next, using the difference between line of sight and non-line of sight measurements a line fitting technique (e.g., one of the following: least squares fitting; weighted linear least squares or robust regression) is applied to determine the parameter $\gamma_i$ (the attenuation characteristic parameter) for the object represented by the RF-attenuation region.

The resulting attenuation parameter data may then be used as part of the input for an RF planning function.

The RF modeling process illustrated in FIGS. 1, 3 and 4 may be extended in some embodiments so as to collect in one operation RF modeling data for several objects. Depending on the configuration of the objects, this may prove to be more convenient than modeling the objects one-by-one.

Figure 5:
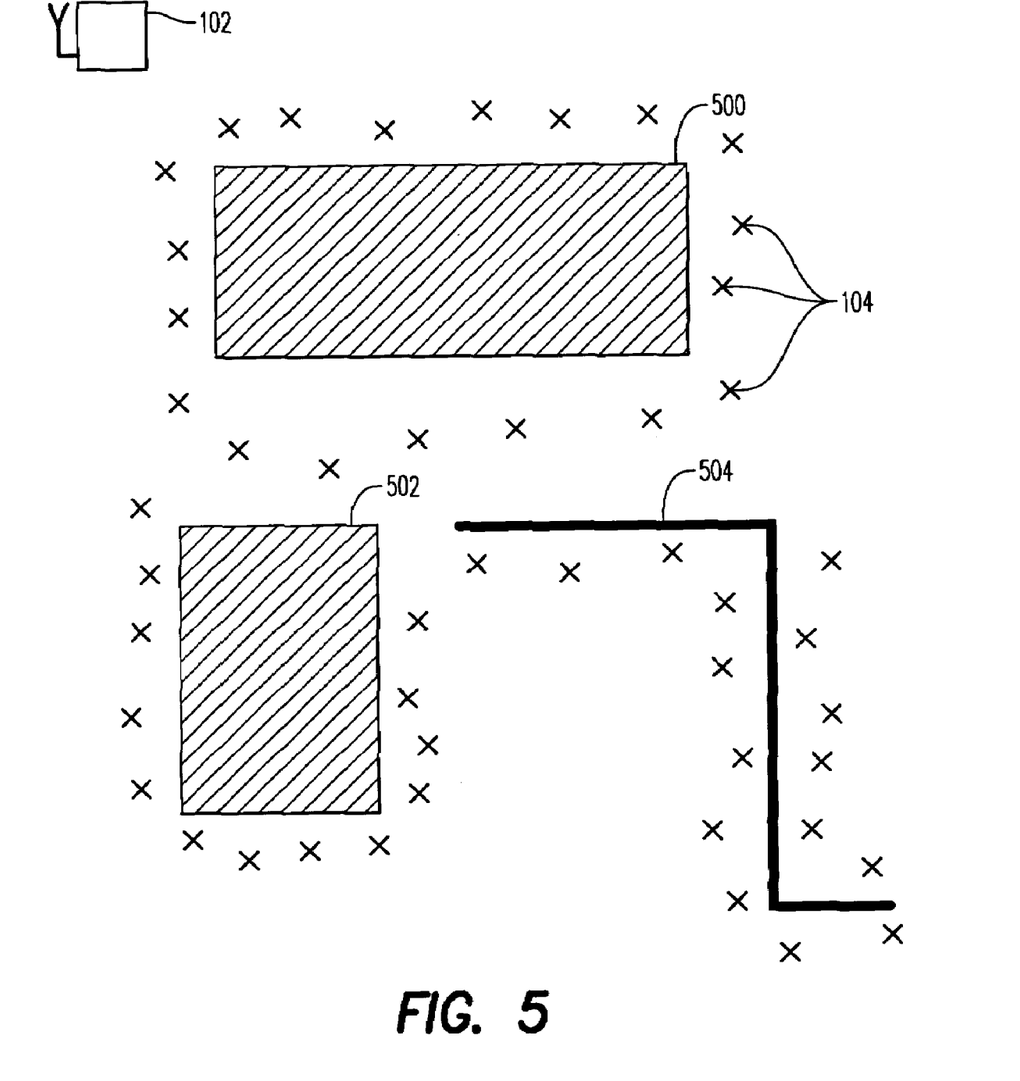
FIG. 5 is an alternative embodiment of the RF-modeling process, applied to several objects at once.

FIG. 5 schematically illustrates the extension of the modeling process to model several objects in one operation. In FIG. 5, the shaded rectangle 500 represents one object to be modeled, and the shaded rectangle 502 represents another object to be modeled in the same operation. A third object, assumed to be an angled wall, is represented at 504. As in FIG. 1, reference numeral 102 indicates an access point or other RF signal source that is temporarily placed near the objects to be modeled. Also as in FIG. 1, cross marks (some indicated by reference numeral 104) represent locations around the objects at which signal level measurements are to be made.

The taking of measurements for the group of objects may proceed as described above in connection with steps 302-306 (FIG. 3) and in FIG. 4. The process illustrated in FIG. 5 may be employed prior to deployment of a proposed wireless data network, or alternatively may be employed, after a wireless data network has been deployed and been in use, for the purpose of refining network features (e.g., frequency and/or signal strength provided by access points) to reflect changes in the operating environments and especially changes in the objects present in the environment.

In analyzing the data for the plurality of objects, and assuming that an environment updating operation is being performed, the measurements may be grouped according to RF-attenuation region. For the i'th RF-attenuation region, there may be $N_i$ primary measurement samples, where a measurement sample is a primary measurement sample for an RF-attenuation region if the RF-attenuation region is the closest RF-attenuation region to the location at which the measurement was taken. The data may be organized into a measurement array ($RSSI_i$, $Dist_i$, $Length_{i,1}$, $Length_{i,2}$, ... $Length_{1,r}$), with dimension $N_i \times (2+r)$, where r is the total number of RF-attenuation regions. Some elements of $Length_{i,j}$ can be zero, which means that the RF-attenuation region in question is not included in the data. Accordingly, the new data provided by the measurement operation is represented by the following matrix:

$$\begin{bmatrix} RSSI_1 & Dist_1 & Length_{1,1} & Length_{1,2} & \cdots & Length_{1,r} \\ RSSI_2 & Dist_2 & Length_{2,1} & Length_{2,2} & \cdots & Length_{2,r} \\ \vdots & \vdots & \vdots & \vdots & \ddots & \vdots \\ RSSI_s & Dist_s & Length_{s,1} & Length_{s,2} & \cdots & Length_{s,r} \end{bmatrix}$$

Next the new data is separated into a set of line of sight data and a set of non-line of sight data according to whether the relevant $Length_{i,j}$ is zero or nonzero.

Then updating of $\alpha$ and $\beta$, to provide updated values $\hat{\alpha}$ and $\hat{\beta}$, is performed by fitting the regression model:

$$RSSI = \alpha + \beta \cdot \log_{10}(Dist) \qquad (Eq. 3)$$

For the purposes of the ensuing discussion the shorthand term "Y" will be employed to represent RSSI and the shorthand term "X" will be employed to represent $\log_{10}(Dist)$.

The updated values are estimated using the following formulae, where "$\overline{x}$" represents the average of x.

$$\hat{\beta} = \frac{\overline{XY} - \overline{X}*\overline{Y}}{\overline{X^2} - (\overline{X})^2} \qquad (Eq. 4)$$

and $$\hat{\alpha} = \overline{Y} - \hat{\beta}*\overline{X} \qquad (Eq. 5)$$

Thus, in order to update $\alpha$ and $\beta$ it is only necessary to update the averages $\overline{X}$, $\overline{Y}$, $\overline{XY}$, and $\overline{X^2}$.

Let $V_{old}$ be an n×1 vector denoting the old data and let $V_{new}$ be an m×1 vector denoting the new data, then the average of the combination $$\begin{pmatrix} V_{old} \\ V_{new} \end{pmatrix}$$

will be:

$$\frac{n}{n+m}\overline{V}_{old} + \frac{m}{n+m}\overline{V}_{new} \qquad (Formula\ 6)$$

In some cases it may be desirable to apply different weighting to the new data and the old data to reflect the relative reliability of the data. Let the weight on $V_{old}$ be $(1-w)$ and the weight on $V_{new}$ be w, with w in the interval [0,1]; then the updated value is expressed as:

$$(1-w)\frac{n}{n+m}\overline{V}_{old} + w\frac{m}{n+m}\overline{V}_{new} \qquad (Formula\ 7)$$

The averages $\overline{X}$, $\overline{Y}$, $\overline{XY}$, and $\overline{X^2}$ may be updated using either Formula (6) or Formula (7), and then $\beta$ and $\alpha$ may be updated using equations (4) and (5), respectively.

Next the values for the parameters $\gamma$ may be updated using non-line of sight data. To do so, the old data and the new are to be combined in a suitable manner as described below.

For the old data define $$Y_{old} = \begin{pmatrix} RSSI_1 \\ RSSI_2 \\ \vdots \\ RSSI_s \end{pmatrix} - \hat{\alpha} - \hat{\beta}*\log_{10}\begin{pmatrix} Dist_1 \\ Dist_2 \\ \vdots \\ Dist_s \end{pmatrix} \qquad (Eq.\ 8)$$

and, $$X_{old} = \qquad (Eq.\ 9)$$

$$\begin{pmatrix} \log_{10}(1 + length_1) & 0 & 0 & 0 \\ 0 & \log_{10}(1 + length_2) & 0 & 0 \\ 0 & 0 & \ddots & \vdots \\ 0 & 0 & \cdots & \log_{10}(1 + length_s) \end{pmatrix}$$

The new data may be written in a similar way, denoted by $X_{new}$ and $Y_{new}$. If there is no measurement for a particular region, the corresponding value is set to zero. The form of $X_{new}$ may differ from the form of $X_{old}$, in that, because of the possibility of measuring for more than one object simultaneously, the matrix may no longer be diagonal, as illustrated below.

$$X_{new} = \begin{pmatrix} \log_{10}(1+length_{1,1}) & \log_{10}(1+lenght_{1,2}) & \ldots & \log_{10}(1+length_{1,r}) \\ \log_{10}(1+length_{2,1}) & \log_{10}(1+length_{2,2}) & \ldots & \log_{10}(1+length_{2,r}) \\ \vdots & \vdots & \ddots & \vdots \\ \log_{10}(1+length_{s,1}) & \log_{10}(1+length_{s,2}) & \ldots & \log_{10}(1+length_{s,r}) \end{pmatrix} \quad \text{(Eq. 10)}$$

Assuming that it is desirable to provide different weighting for old and new data, the array $\Gamma=(\gamma_1, \gamma_2, \ldots, \gamma_r)^T$ may be estimated by solving:

$$\hat{\Gamma}=\min_\Gamma\{(1-w)(Y_{old}-X_{old}\Gamma)^T(Y_{old}-X_{old}\Gamma)+w(Y_{new}-X_{new}\Gamma)^T(Y_{new}-X_{new}\Gamma)\} \quad \text{(Eq. 11)}$$

and the solution is $$\hat{\Gamma}=((1-w)X_{old}^T X_{old}+wX_{new}^T X_{new})^{-1}((1-w)X_{old}^T Y_{old}+wX_{new}^T Y_{new}) \quad \text{(Eq. 12)}$$

Because of the special structure of $X_{old}$, $X_{old}^T X_{old}$ is an r×r diagonal matrix. As a result, it is sufficient to save two vectors—the diagonals of $X_{old}^T X_{old}$ and $X_{old}^T Y_{old}$—in software for the old measurement data. Thus the amount of data that must be stored is relatively small. With new incremental measurements, γ can easily be refined based on Eq. (12) after calculating $X_{new}^T X_{new}$ and $X_{new}^T Y_{new}$.

With the modeling concepts disclosed herein, it is generally possible to make reliable estimates of the RF attenuation parameters of the objects for which measurements are made. The modeling is straightforward and easily applied and only a modest amount of memory space is needed to store the old data. Moreover, the required calculations may be performed rapidly, so that continuous incremental updates may be made during operation of the network.

There will now be presented a statistical analysis by which it may be estimated how many measurements may be needed to have reasonable assurance of a desired degree of accuracy of the RF characteristic information for the objects to be modeled. The analysis may be useful for achieving a conservative measurement process to promote reliable modeling of the RF coverage to be provided by the proposed system.

The model for the detailed statistical analysis may be stated as follows:

$$Y_{ijk}:=(RSSI_{ijk})-\alpha-\beta*\log_{10}(Dist_{ijk})=(\gamma+\delta_i)*\log_{10}(1+length_{ij})+e_{ijk} \quad \text{(Eq.13)}$$

where:

i=1, ..., M denotes the site number;

j=1, ,$n_i$ denotes the location number at the i'th site;

k=1, ..., $N_{ij}$ denotes the measurement number at the j'th location for the i'th site;

$RSSI_{ijk}$, $Dist_{ijk}$, and $length_{ij}$ are respectively the measurements for signal strength, distance to signal source and distance the signal travels within the RF-attenuation region;

α and β are constants for a given frequency;

$\delta_i$ indicate the site effect, and are independent and identically distributed (i.i.d.) as a normal distribution $N(0,\sigma^2)$; and $e_{ijk}$ indicate the measurement error, and are i.i.d. as a normal distribution $N(0,\tau^2)$.

Under this model, the sample set for γ is $\{\gamma+\delta_i\}$, which follows the normal distribution. In one example, γ is estimated by the 19$^{th}$ 5% quantile to provide a conservative and reliable estimate.

The following algorithm may be employed as part of the process to obtain an estimate of the number of measurements that should be made:

(a) Take the average of $y_{ijk}$ on k to eliminate the measurement error $e_{ijk}$:

$$Y_{ij.}=(\gamma+\delta_i)\log_{10}(1+length_{ij}) \quad \text{(Eq.14)}$$

(b) Estimate $(\gamma+\delta_i)$ as:

$$\sum_j Y_{ij} * \log_{10}(1+length_{ij}) \Big/ \sum_j \log_{10}(1+length_{ij}) \quad \text{(Formula 15)}$$

(c) Use the standard deviation of $\{\hat{\gamma}_i\}$ to provide an estimate of σ, the estimate being denoted as $\hat{\sigma}$;

(d) Use the average of $\{\hat{\gamma}_i\}$ to estimate γ, the estimate being denoted as $\hat{\gamma}$;

(e) Since $\gamma+\delta$ follows the normal distribution $N(\hat{\gamma}, \hat{\sigma}^2)$, estimate γ by the p'th sample quantile of $\{\gamma+\delta_i\}$: $(\gamma+\delta_i)_{\lceil Mp \rceil}$, where $\lceil x \rceil$ is the ceiling integer of x and $x_{\lceil Mp \rceil}$ is the $\lceil Mp \rceil$-th item of ordered statistics of $x_1, \ldots, x_M$.

If $X_a, \ldots, X_n$ are i.i.d. with density function $f(\cdot)$ and distribution function $F(\cdot)$, it can be shown that the p'th quantile estimate $X_{\lceil np \rceil}$ has the distribution:

$$\sqrt{n}(X_{\lceil np \rceil} - F^{-1}(p)] \to N\left(0, \frac{p(1-p)}{f^2(F^{-1}(p))}\right) \quad \text{(Statement 16)}$$

Let the p'th quantile estimate $X_{\lceil np \rceil}$ be considered reliable if it falls into the (100−κ)% confidence interval. Taking κ as 5, the 95% confidence interval is indicated by:

$$\left[F^{-1}(p) - 1.96 * \frac{\sqrt{p(1-p)}}{\sqrt{n} * f(F^{-1}(p))}, \right.$$
$$\left. F^{-1}(p) + 1.96 * \frac{\sqrt{p(1-p)}}{\sqrt{n} * f(F^{-1}(p))}\right] \quad \text{(Expression 17)}$$

Since γ+δ has the distribution $N(\gamma,\sigma^2)$, once the estimates $\{\hat{\gamma}_i\}$, i=1, ..., M are available, the density function $f(\cdot)$ and the distribution function $F(\cdot)$ of γ+δ can be estimated which are sufficient for estimating γ and σ: γ is estimated by the average of $\hat{\gamma}_i$'s, and a is estimated by the standard deviation of $\hat{\gamma}_i$'s.

The difference between the p'th sample quantile and the p'th population quantile can be thought of as an error (Error). In order to estimate the sample size, it is necessary to set up an upper bound of the error. The margin of error E is the maximum difference between the estimated p'th quantile $X_{[np]}$ and the true value of the p'th quantile of $\gamma+\delta$.

Based on Statement (16), $\sqrt{n}*\text{Error} \sim N(0,\sigma^2)$. Then, if the $(100-\kappa)$ % confidence interval is used, the following is the case:

$$E = z_{\kappa/2} \frac{\sigma}{\sqrt{n}} \quad \text{(Eq. 18)}$$

where:

$z_{\kappa/2}$ is known as the critical value, i.e., the positive z value that is at the vertical boundary for the area $\kappa/2$ in the right tail of the standard normal distribution ($z_{\kappa/2}$=1.96 for the 95% confidence interval);

$\sigma$ is the population standard deviation; and n is the sample size.

Equation 18 can be rearranged to solve for the sample size necessary to produce results accurate to a specified confidence level and margin of error:

$$n = (z_{\kappa/2}\sigma/E)^2 \quad \text{(Eq. 19)}$$

To choose an acceptable maximum value of E, examine the signal loss formula $\gamma \log_{10}(1+\text{length})$. Thus if E=1, at 100 meters, the differences of signal losses will be less than 2 dB between the true model and the estimated model. If E=5, the difference will be 10 dB at 100 meters.

Figure 6:
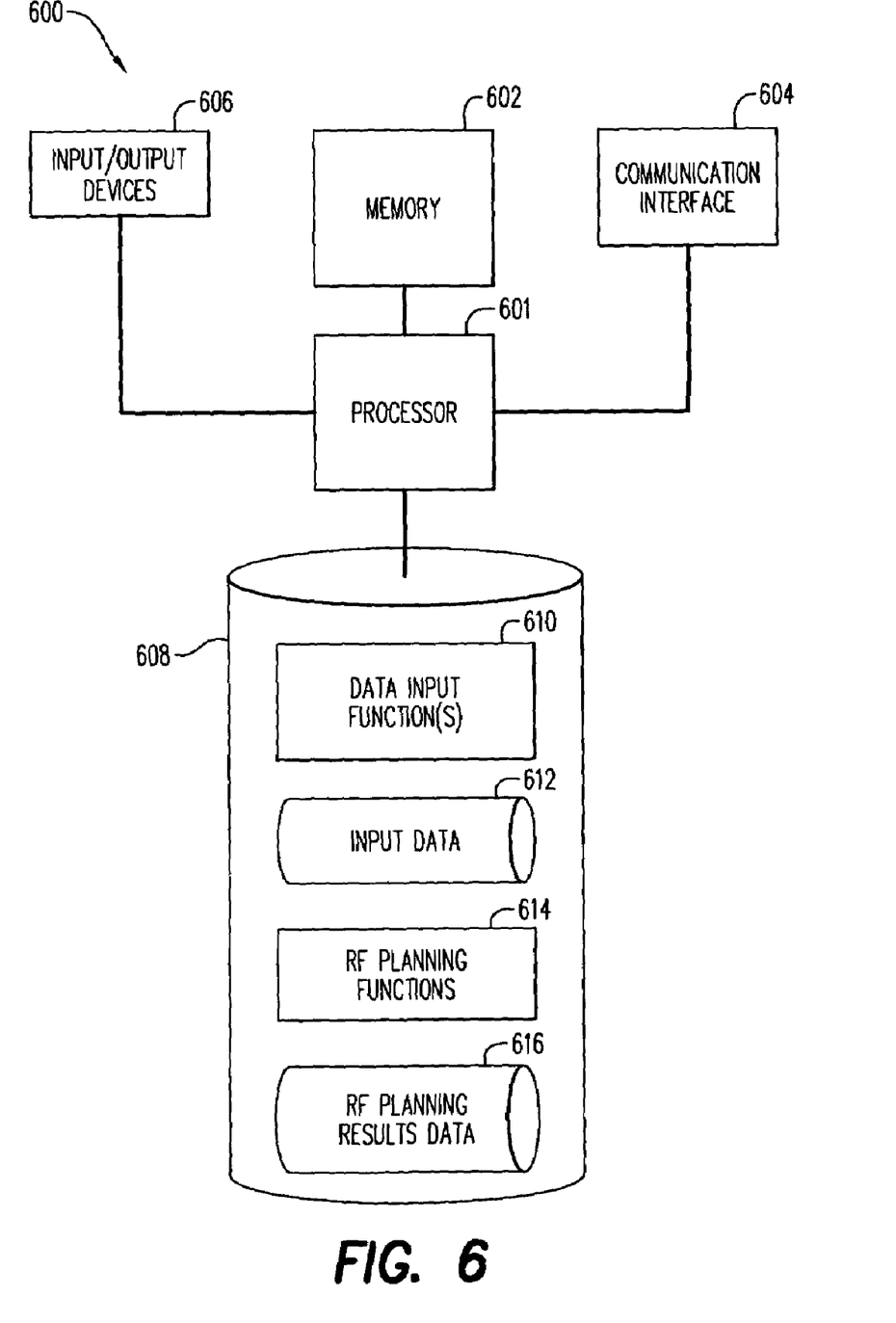
FIG. 6 is a block diagram of a computer in which certain aspects of the invention may be implemented.

FIG. 6 is a block diagram of a computer 600 in which other aspects of the invention may be implemented. The computer 600 may, for example, implement some or all of the RF planning data input functions described below. The computer 600 may, in some embodiments, be entirely conventional in terms of its hardware aspects. For example, the computer 600 may, in its hardware aspects and some of its software, be a conventional personal computer. As indicated in this paragraph and discussed further below, software may be provided to control the computer 600 in accordance with aspects of the present invention, and data may be stored and manipulated in the computer 600 in accordance with aspects of the present invention.

The computer 600 may include one or more processors 601, which may be a conventional microprocessor or microprocessors. Also included in computer 600 is memory 602 that is in communication with the processor 601. The memory 602 may be, in some embodiments, one or more of RAM, ROM, flash memory, etc., and may serve as one or more of working memory, program storage memory, etc.

In some embodiments, the computer 600 may also include a communication interface 604. The communication interface 604 may, for example, allow the computer 600 to access information via a data network. In addition or alternatively, some or all of the data required for the processes described below may be provided to the computer 600 via one or more storage media such as floppy disks, CD-ROMs, etc., or via direct input from a user. Media drives for such media may be included in the computer 600 but are not separately shown.

As seen from the drawing, the computer 600 may also include a number of different input/output devices 606, including, for example, a display screen, a conventional pointing device such as a mouse, trackball, touchpad, etc., a computer keyboard, and a printer.

Also included in the computer 600, and in communication with the processor 101, is a mass storage device 608. Mass storage device 608 may be constituted by one or more magnetic storage devices, such as hard disks, one or more optical storage devices, and/or solid state storage. The mass storage 608 may store software 610 which controls the computer 600 to receive input regarding attributes, and the intended operating environment of, a proposed wireless data network. The data may be stored in one or more data storage structures 612 maintained in the mass storage 608. The mass storage 608 may also store software 614 to perform RF planning functions utilizing the data stored at 612. In addition, other software, which is not represented in the drawing, may be stored in the mass storage 608, including operating system software and/or other applications that allow the computer 600 to perform other functions in addition to RF planning and the inputting of data used in RF planning. Still further, the mass storage 608 may store one or more data storage structures 616 to store the data which results from operation of the RF planning software. In practice the functions described herein may all be performed in one computer or may be divided among two or more computers that may be in communication with each other and/or may exchange data via removable memory devices such as floppy disks, CD-ROMs, etc. It will be appreciated that all of the software referred to above may be temporarily stored in memory 602 and fetched instruction-by-instruction by the processor 601 to program the processor 601. The software may also be referred to as "program instructions" or "computer readable program code".

Figure 7:
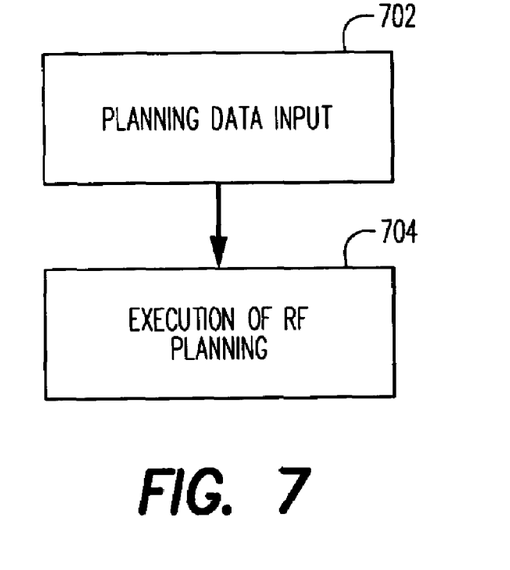
FIG. 7 is a high-level flow chart that illustrates a process that may be performed in the computer of FIG. 6.

FIG. 7 is a high level flow chart that illustrates a process which may be performed in the computer 600. At 702, data required for performing an RF planning function (e.g., for planning the locations and types of components of a wireless LAN (local area network)) is input. At least some portions of the data input at step 702 may be performed in accordance with aspects of the present invention. At 704, the data provided at 702 is used as an input for the RF planning function, which may generally be carried out in accordance with conventional practices.

FIG. 8 is a flow chart that shows some details of the data input process of FIG. 2. At 802, data concerning a building or buildings in which the network is to be installed is provided to the computer 600. The data may include the compositions and locations of building features such as walls, floors, fixed items of equipment, etc. Inputting of this data to the computer 600 may be performed at least in part according to aspects of the invention which will be described below. At 804, the user inputs to computer 100 the proposed locations and/or other characteristics of RF signal sources such as access points and base stations.

Figure 9:
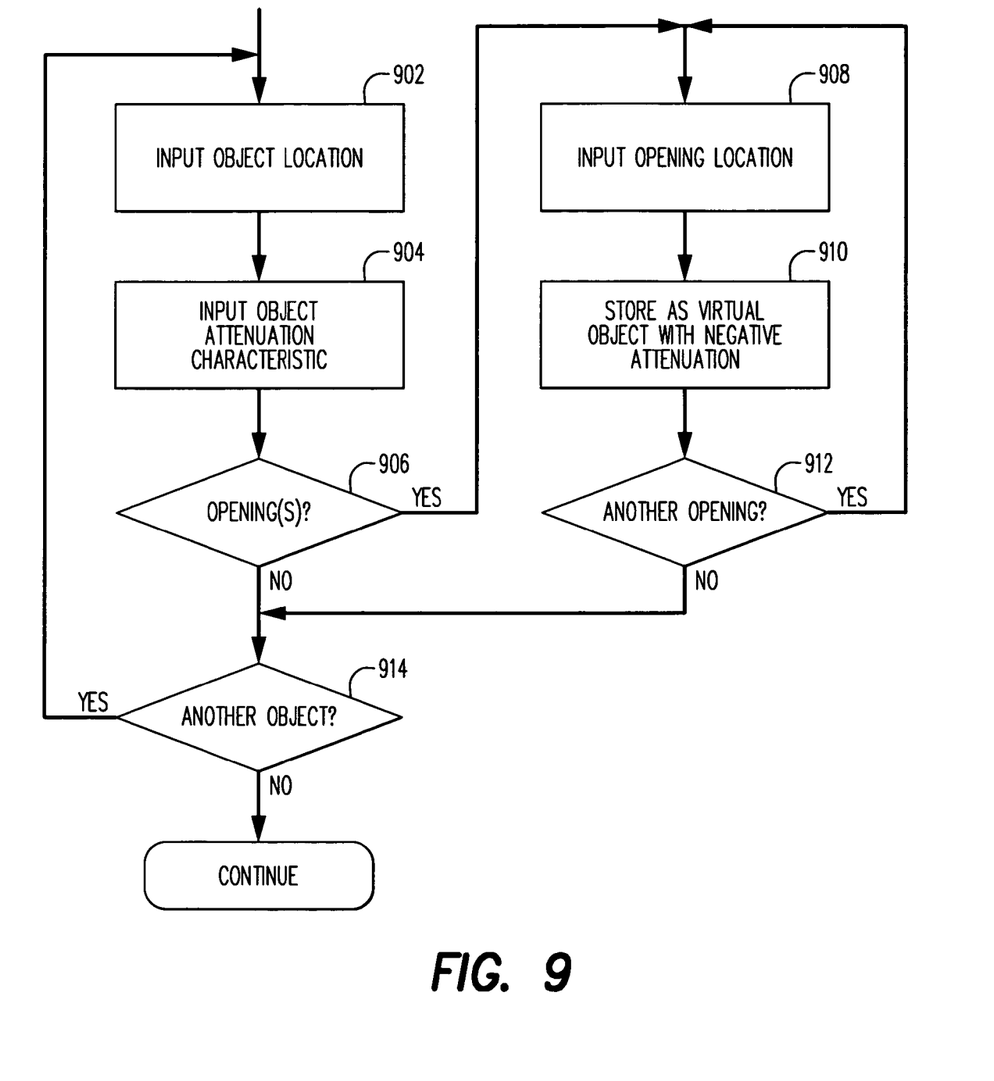
FIG. 9 is a flow chart that illustrates further details of the process of FIGS. 7 and 8.

FIG. 9 is a flow chart that shows some details of the process of FIGS. 7 and 8. In particular, FIG. 9 shows how data concerning objects and openings in objects may be entered into the computer 600 in regard to step 802 (FIG. 8) and in accordance with aspects of the invention. At 902, data is input to the computer 600 in regard to the location of an object such as a wall or floor that forms part of a building in which the proposed wireless data network is to be deployed. The inputting of the object location data may be performed in accordance with conventional practices, such as by direct importation of data from another source or from a data storage medium, or alternatively by the user interacting with a user interface in a conventional manner. However, the inputting of the object location data may be modified so as to initially disregard the presence of any openings in the object. That is, the object location data input at 902 may not reflect any openings in the object. The object location data may represent the object in terms of location and physical extent, and both aspects of the object location data may be provided by inputting the locations of surfaces of the object.

At 904, data that represents an RF attenuation characteristic of the object is input into the computer 600. This also may be done in a conventional manner, and indicates the degree to which RF signals are likely to be attenuated by passing through the object.

At 906, it is determined whether there are any openings in the object for which data was input in steps 902 and 906. An example of an opening that may be present is an atrium formed by openings in one or more floors of a building. If there is an opening or openings in the object, data indicating the location of an opening in the object is input to the computer 600 at step 908. This may be done by the user of the computer 600 interacting with a user interface that may resemble a computer drawing software package or a CAD (computer aided design) package. The user may draw lines or create drawing figures to show the location of the opening relative to the object in which it is formed and/or relative to a coordinate system used to indicate the locations of objects.

Figure 10:
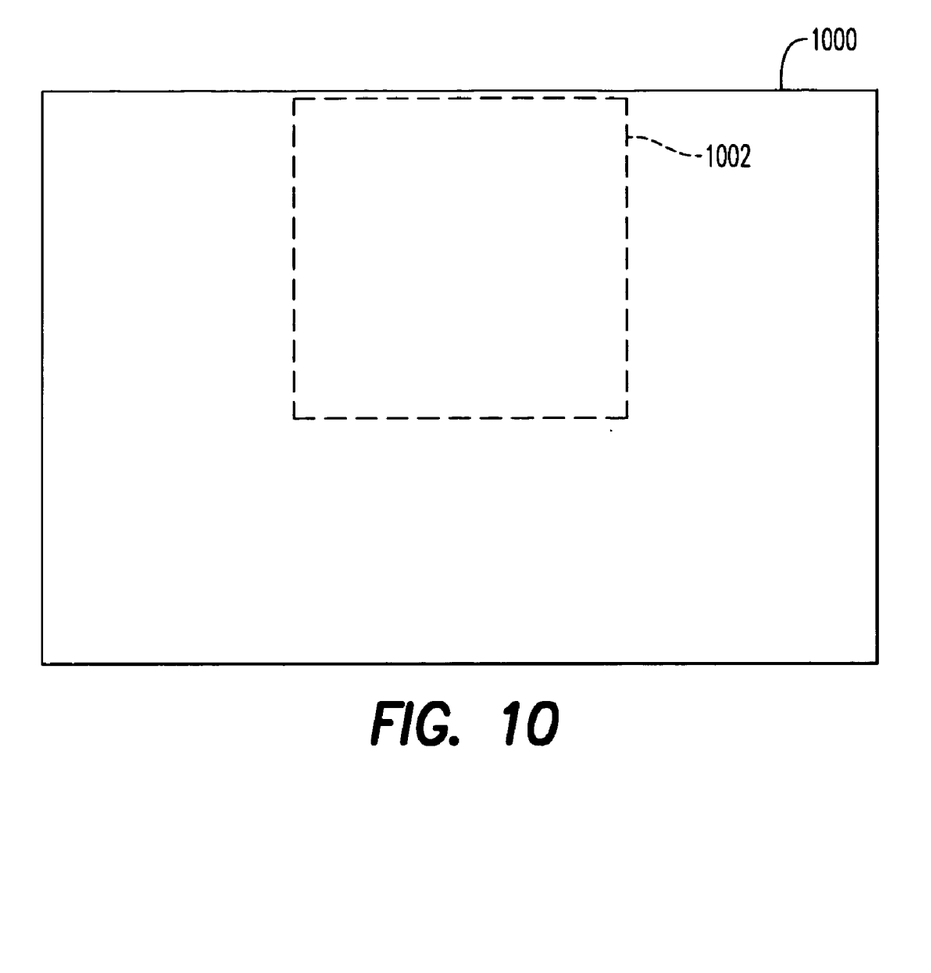
FIGS. 10 and 11 schematically illustrate modeling of an object and an opening in the object in accordance with the process of FIGS. 7-9.
Figure 11:
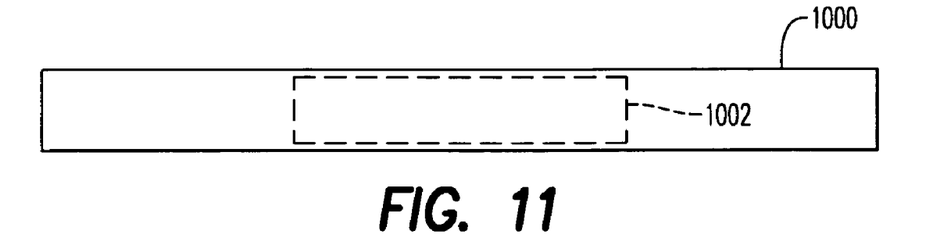

FIGS. 10 and 11 schematically indicate how an object (floor 1000) and an opening 1002 formed (e.g. by an atrium) in the object, may be modeled according to aspects of the invention. It will be understood that FIG. 10 is a schematic plan view of the floor 1000 and that FIG. 11 is a schematic sectional view of the floor 1000. (Although, for purposes of presentation, some boundaries (i.e., dashed lines) of the opening 1002 are shown adjacent to some boundaries (solid lines) of the floor 1000, in practice such boundaries may be shown as coinciding, by e.g. representing the boundaries of the opening in a different color from the color used for the boundaries of the object.)

The opening location data input at step 908 may represent the opening in terms of location and physical extent, and both aspects of the opening location data may be provided, at least in part, by inputting the locations of surfaces of the object which define the opening.

At 910, the data input at 908 is stored in the computer 600 so as to represent a virtual object, having the same location as the opening, and exhibiting an attenuation characteristic that is equal in magnitude but opposite in sense to the attenuation characteristic of the object in which the opening is formed. In this way, the "negative attenuation" attributable to the opening/virtual object will effectively cancel, at the locus of the opening, the "positive attenuation" attributable for RF modeling purposes to the object in which the opening is formed. It will be appreciated that the model thus formed may have the opening/virtual object overlapping in space with the object in which the opening is formed. This approach may simplify the entry of object location data and/or may increase the accuracy of the building model employed for RF planning purposes.

At 912, a determination is made as to whether there are any other openings in the object for which the data was input at steps 902, 904. If so, the process loops back to perform steps 908, 910 with respect to the next opening in the object. If there are no more openings in the object, a determination is made at 914 as to whether there are any further objects for which RF modeling data is to be input. If so, the process loops back to steps 902 and 904 for the next object.

If at 906 it is determined that there are no openings in the object, then the determination at 914 immediately follows the determination at 906.

The object location and attenuation characteristic data, along with the opening/virtual object data and the data concerning the proposed RF sources for the proposed network may be used by the computer 600 to calculate estimated signal levels to be provided at various points in space by the proposed network.

In addition to or instead of employing principles of the invention in regard to planning for a wireless LAN, the invention may also be applied to planning for other types of communications networks, such as those employing the well-known Bluetooth, WiMax and UWB (ultawideband) standards.

Although the system has been described in detail in the foregoing embodiments, it is to be understood that the descriptions have been provided for purposes of illustration only and that other variations both in form and detail can be made thereupon by those skilled in the art without departing from the spirit and scope of the invention, which is defined solely by the appended claims.

What is claimed is:

1. A computer-implemented method for radio frequency (RF) planning, the method comprising:

inputting, to a computer, source data representative of RF sources in a proposed wireless data network;

inputting, to the computer, first object data representative of objects located in an environment of the proposed wireless data network;

inputting, to the computer, second object data representative of openings in the objects located in the environment of the proposed wireless data network;

using the source data, the first object data and the second object data to calculate, by use of the computer, estimated signal levels to be provided at points in space by the proposed wireless data network; and using said estimated signal levels to plan the proposed wireless data network.

2. A method according to claim 1, wherein:

the first object data represents each of said objects located in the environment of the proposed wireless data network in terms of location, physical extent and an attenuation characteristic having a first sense; and the second object data represents each of the openings as a virtual object in terms of location, physical extent and an attenuation characteristic that is equal in magnitude and opposite in sense to the attenuation characteristic of the respective object in which said each opening is formed.

3. A method according to claim 1, wherein said objects located in the environment of the proposed wireless data network include at least one of: (a) walls and (b) floors.

4. A measurement device, comprising:

a housing;

a processor mounted inside the housing;

a memory inside the housing and in communication with the processor;

a display mounted on the housing and controlled by the processor; and signal level means, in communication with the processor, for measuring a level of a received radio frequency (RF) signal;

wherein the memory stores program instructions to control the processor to:

receive a first indication, said first indication indicative of a current location of an RF signal source;

receive a first plurality of location information representing a geometry of a first object;

receive a first plurality of RF measurements, each of said first plurality of RF measurements representing the current level of RF signal measured by said signal level means corresponding to one of said first plurality of location information; and deriving RF attenuation modeling parameters of said first object based on said first plurality of RF measurements and said first plurality of location information.

5. A measurement device according to claim 4, wherein said program instructions control the processor to:

receive a second plurality of location information representing a geometry of a second object:

receive a second plurality of RF measurements, each of said second plurality of RF measurements representing the current level of RF signal measured by said signal level means corresponding to one of said second plurality of location information; and deriving RF attenuation modeling parameters of said second object based on said second plurality of RF measurements and said second plurality of location information.

6. A measurement device according to claim 5, wherein: the display includes a touch screen; and the processor is operative to receive the third and fourth indications simultaneously by detecting a single stylus touch on the touch screen.

7. A measurement device according to claim 5, wherein said program instructions determine all RF attenuation modeling parameters for all of a plurality of objects in one matrix operation derived from corresponding RF measurements and corresponding location information for each of said plurality of objects, wherein said plurality of objects include said first object and said second object.

8. A measurement device according to claim 4, further comprising a Global Positioning System (GPS) unit in the housing;

and wherein the processor receives the third indication from the GPS unit.

9. A measurement device according to claim 4, wherein the measurement device has a form factor substantially equal to one of: (a) a form factor of a notebook computer; and (b) a form factor of a personal digital assistant (PDA).

10. A method for generating radio frequency (RF) planning modeling data for an object, said method comprising the steps of:

placing an RF signal source in proximity to said object;
receiving a current location of said RF signal source;
receiving a plurality of location information representing a geometry of said object;
receiving a plurality of RF measurements, each of said plurality of RF measurements representing the current level of RF signal measured from the RF signal source corresponding to one of said plurality of location information; and
deriving RF planning modeling data of said object based on said plurality of RF measurements and said plurality of location information.

11. A method according to claim 10, wherein said RF planning modeling data comprises RF attenuation modeling parameters.

12. A method for generating radio frequency (RF) modeling data for a plurality of objects based on stored field measurement data obtained by placing an RF signal source in proximity to the objects, positioning a receiver at a plurality of locations around the objects, and determining and storing both the RF signal level received at each of said plurality of locations and the distance of each of said plurality of locations from said RF signal source, said modeling data for use as part of the input for RF network planning, the method comprising the steps of:

associating, for each of the plurality of locations, the stored RF signal level of one of the plurality of locations with one of the plurality of objects;

determining a length of each of the plurality of objects along a line from the RF signal source to each of the plurality of locations; and determining in one matrix operation all RF attenuation modeling parameters for all of said plurality of objects derived from the analyzed stored field measurement data and from said length of each of the plurality of objects, said RF attenuation modeling parameters for use as part of the input for RF network planning.

13. A method according to claim 12, wherein said associating step comprises the step of determining, for each of the plurality of locations, that the stored RF signal level of said one of the plurality of locations is closest to said one of the plurality of objects.

14. A method according to claim 13, wherein said step of determining in one matrix operation all RF attenuation modeling parameters for all of said plurality of objects comprises the step of applying a statistical line-fitting technique to the stored RF signal levels for said plurality of locations that considers said length of each of the plurality of objects.

15. A method according to claim 14, wherein said statistical line-fitting technique comprises least squares fitting, weighted linear least squares regression, or robust regression.

16. A method according to claim 14, further comprising the steps of:

identifying a total number of said plurality of locations;
indicating a desired degree of accuracy in the RF attenuation modeling parameters; and
determining how many additional field measurement data are needed based on said amount and a statistical variation of the RF attenuation modeling parameters from the stored field measurement data.

17. A method according to claim 16, wherein continuous incremental updates in the stored field measurement data may be made during operation of said planned RF network in order to improve the generated RF attenuation modeling parameters.

18. A method according to claim 17, wherein at least one of said objects is a combination of first object data and a second object data, wherein said first object represents a physical object having a first location, first extent and first RF attenuation modeling parameter and located in the environment of the planned RF network, and wherein said second object data represents an opening in said physical object as a virtual object having a second location, second extent and second RF attenuation modeling parameter that is equal in magnitude and negative in sense compared to the first attenuation modeling parameter, and wherein said second location overlaps said first location.

19. A method according to claim 14, wherein at least one of said objects is a combination of first object data and a second object data, wherein said first object represents a physical object having a first location, first extent and first RF attenuation modeling parameter and located in the environment of the planned RF network, and wherein said second object data represents an opening in said physical object as a virtual object having a second location, second extent and second RF attenuation modeling parameter that is equal in magnitude and negative in sense compared to the first attenuation modeling parameter, and wherein said second location overlaps said first location.

20. A method according to claim 12, wherein at least one of said objects is a combination of first object data and a second object data, wherein said first object represents a physical object having a first location, first extent and first RF attenuation modeling parameter and located in the environment of the planned RF network, and wherein said second object data represents an opening in said physical object as a virtual object having a second location, second extent and second RF attenuation modeling parameter that is equal in magnitude and negative in sense compared to the first attenuation modeling parameter, and wherein said second location overlaps said first location.

* * * * *